US008341298B2

(12) United States Patent
Wilber et al.

(10) Patent No.: US 8,341,298 B2
(45) Date of Patent: Dec. 25, 2012

(54) SCALABLE ON-BOARD OPEN DATA NETWORK ARCHITECTURE

(75) Inventors: George F. Wilber, Bellevue, WA (US); Regan K. Brossard, Kent, WA (US)

(73) Assignee: The Boeing Company, Chicago, IL (US)

( * ) Notice: Subject to any disclaimer, the term of this patent is extended or adjusted under 35 U.S.C. 154(b) by 1465 days.

(21) Appl. No.: 11/419,448

(22) Filed: May 19, 2006

(65) Prior Publication Data

US 2007/0127460 A1 Jun. 7, 2007

Related U.S. Application Data

(60) Provisional application No. 60/741,753, filed on Dec. 2, 2005.

(51) Int. Cl.
*G06F 15/16* (2006.01)
*G06F 11/00* (2006.01)
(52) U.S. Cl. .......................... 709/249; 370/241; 370/253
(58) Field of Classification Search .................. 709/249; 701/3; 370/241, 253
See application file for complete search history.

(56) References Cited

U.S. PATENT DOCUMENTS

| 6,148,179 | A * | 11/2000 | Wright et al. ................. 370/310 |
| 6,677,888 | B2 * | 1/2004 | Roy ................................. 342/36 |
| 6,801,769 | B1 * | 10/2004 | Royalty ......................... 455/431 |
| 7,131,136 | B2 * | 10/2006 | Monroe ........................ 725/105 |
| 7,177,939 | B2 * | 2/2007 | Nelson et al. ................. 709/230 |
| 7,194,523 | B2 * | 3/2007 | Nelson et al. ................. 709/218 |
| 7,516,244 | B2 * | 4/2009 | Kelly et al. .................... 709/249 |
| 2003/0003872 | A1 | 1/2003 | Brinkley et al. |
| 2003/0064714 | A1 * | 4/2003 | Sanford et al. ................ 455/414 |
| 2003/0093798 | A1 * | 5/2003 | Rogerson ...................... 725/75 |
| 2005/0002417 | A1 * | 1/2005 | Kelly et al. ................... 370/466 |
| 2005/0090201 | A1 * | 4/2005 | Lengies et al. ............... 455/41.2 |
| 2005/0197965 | A1 * | 9/2005 | Takabayashi et al. ......... 705/59 |
| 2007/0086348 | A1 * | 4/2007 | Paletou ......................... 370/241 |
| 2010/0014537 | A1 * | 1/2010 | Jacquet et al. ................ 370/411 |

FOREIGN PATENT DOCUMENTS

EP 1469652 A1 10/2004

OTHER PUBLICATIONS

PCT Intl Search Report and Written Opinion for Application No. PCT/US2006/045591, dated Apr. 13, 2007, 12 pages.
Saint-Etienne, "Using AFDX as 429 Replacement", at http://www.arinc.com/aeec/general_session/gs_reports/2004/presentations/using_afdx_429_replacement_jean-francios_saint-etienne.pdf, Sep. 2004, 11 pgs.
Schuster, "Integrated Modular Avionics & APEX Standards", AEEC-Airlines Electronic Engineering Committee, Oct. 2002, 13 pgs.

* cited by examiner

*Primary Examiner* — Minh-Chau Nguyen

(57) ABSTRACT

An embodiment of an open data network system facilitates communication between applications related to operation of a vehicle, such as an aircraft, and re-use of components in different systems and implementations. A switch/router communicates data between on-board systems. A server communicates with the switch/router and provides at least one of processing services and storage services to the on-board systems via the switch/router. A network manager communicates with the switch/router to direct the switch/router in selectively allowing access between the on-board systems. In other embodiments, an avionics interface unit communicates with the switch/router and enable communications between at least one avionics system and at least one of the on-board systems. Other embodiments selectively enable on-board systems to communicate with a ground-based network to provide communications between the aircraft and a stakeholder in the operation of the aircraft while isolating flight-critical avionics and flight communications systems from the open data network.

15 Claims, 6 Drawing Sheets

| APPLICATIONS 310 | EFB APPLICATIONS 312 | CABIN APPLICATIONS 314 | AIRLINE APPLICATIONS 316 | PASSENGER ENTERTAINMENT APPLICATIONS 318 |
|---|---|---|---|---|
| SYSTEM SERVICES 330 | SECURITY 332 | CARD LEVEL SERVICES 334 | AVIONICS DATA SERVICES 336 | ELECTRONIC SW DELIVERY/ DATALOAD 338 | MESSAGING DOCUMENTS 340 |
| NETWORK SERVICES 350 | NETWORK MANAGEMENT 352 | IP SERVICES 354 | DEGRADED OPERATION 356 | NETWORK ADDRESSING 358 | WIRELESS ACCESS 360 |
| NETWORK ARCHITECTURE 370 | ETHERNET 372 | INTERNET PROTOCOL 374 | VLANs AND SUB-NETS 376 | FIREWALLS 378 |
| OPERATING SYSTEM 380 | WINDOWS 382 | LINUX 384 |
| PHYSICAL PACKAGING 390 | [HARDWARE] |

SCALABLE ON-BOARD OPEN DATA NETWORK ARCHITECTURE

RELATED APPLICATION

This application claims the benefit of U.S. Provisional Application 60/741,753 filed Dec. 2, 2005.

FIELD OF THE INVENTION

The present disclosure relates to computer systems, and more specifically, to computer systems used aboard aircraft.

BACKGROUND OF THE INVENTION

Contemporary commercial aircraft may each include a number of computing systems. These computing systems may be dedicated to different, designated functions. Moreover, different aircraft models, or even different implementations of the same aircraft models, each may include a plurality of different computing systems.

For example, multiple computers are used on the flight deck to support and automate flight systems. Additional computers are used for maintenance purposes, such as by monitoring on-board systems and relaying telemetry to ground stations. In addition, computers are used on commercial airlines to control passenger services, such as by providing on-board entertainment. More recently, networking services such as Connexion by Boeing® provides an air-to-ground communications link that allows passengers to access the Internet while in flight. In any case, there is little commonality between these different systems.

Conventionally, these computer systems tend to be separate, standalone systems. For safety and security reasons, it may be desirable for at least some of the flight deck systems, including those that control flight operations, to be isolated from other systems. However, for systems in the passenger cabin and other systems that are not essential for flight, maintaining separate systems may be wasteful. Furthermore, as needs change, scaling these systems may be difficult because each relies on dedicated resources. Similarly, because of the separateness of the systems, when one system fails, other systems cannot be used to provide backup for the other systems.

A worthy goal in implementing computing systems for commercial aircraft is to establish a "reference architecture." A reference architecture describes a design indicating parts included in the design without restricting the details such as, for example, with what airplanes the design is used, the quantity, capacity, size, performance, installation location, or cost of the components it is installed on, size, quantity, cost, performance, location on the airplane. An appropriate reference architecture specifies high level expectations and generalized descriptions of the components used to implement that design.

Previous attempts to establish a reference architecture for aircraft are heavily dependent upon particular hardware implementations and have not met with wide acceptance. These architectures have been rejected as not being suitable for particular aircraft designs. They have not been considered practical in the marketplace for aircraft that do not have sufficient needs that would justify the particular hardware-centric architectures currently available, or have not been judged as not providing sufficient cross-platform commonality.

SUMMARY OF THE INVENTION

According to one embodiment, an aircraft comprises a network divided into subnets, a flight-critical system connected to the network as a first subnet; and a non-flight-critical system connected to the network as a second subnet. The network includes means for selectively isolating the first subnet from the second subnet.

An open data network provides numerous advantages. First, embodiments of the open data work are adaptable to different types of vehicles and different applications without having to identify, configure and install dedicated hardware for specific vehicles and applications. Second, embodiments of the invention allow the different systems to communicate to take advantage of the resources each provides. Third, embodiments of the invention provide selective communication between the systems to isolate those systems or applications from users or systems not authorized to access those systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the following drawings.

FIG. 3 is a block diagram of aircraft subsystems interconnected using an open data network.

DETAILED DESCRIPTION

Overview

Figure 1:
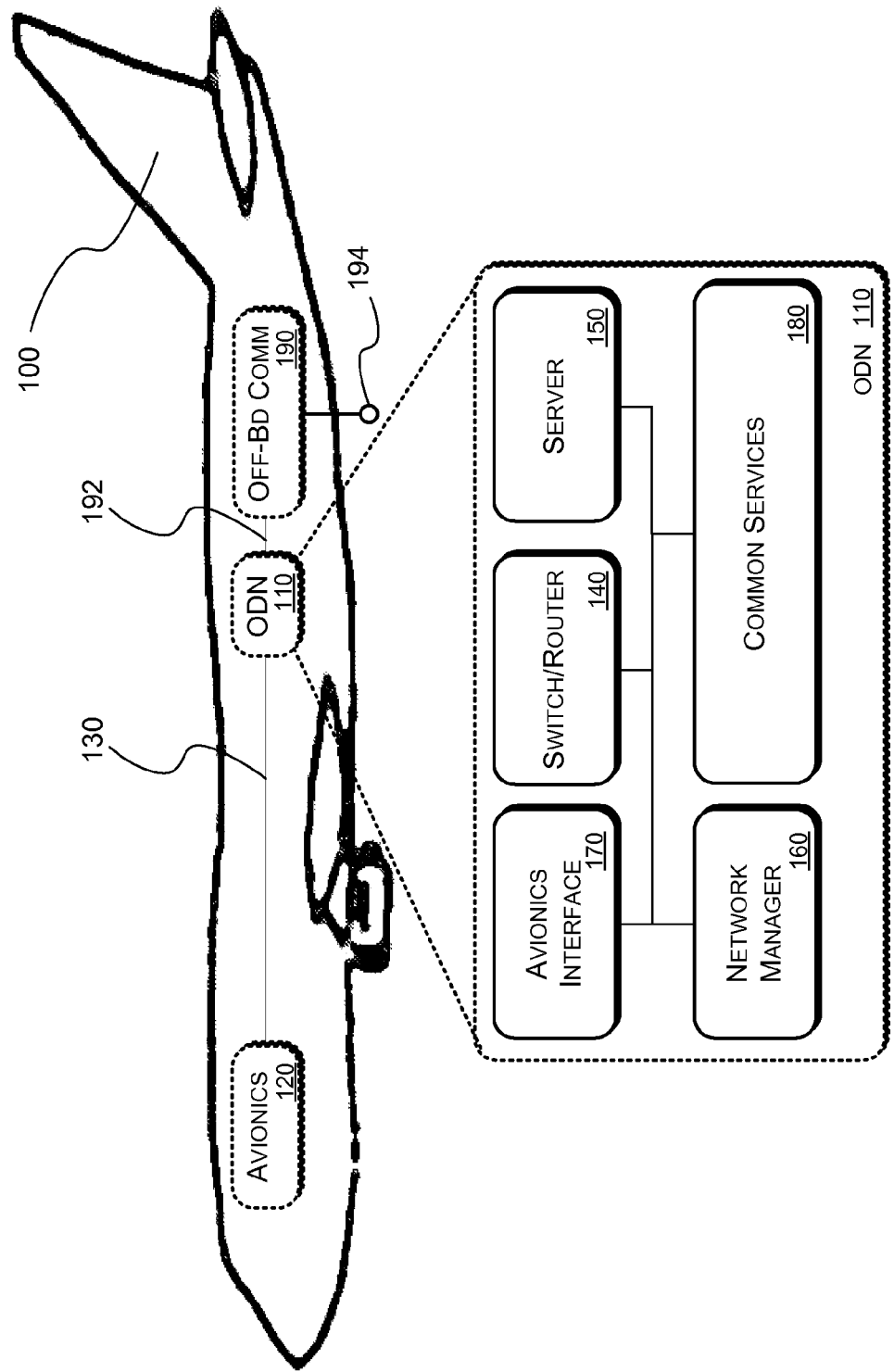
FIG. 1 (Background) is block diagram of an open data network system on an aircraft.

Embodiments of the present invention are directed to facilitating an open data network ("ODN") for connecting aircraft systems to provide system redundancy, allow the user of commercial off-the-shelf ("COTS") components, promote scalability of computing systems, and maximize use of available on-board resources to support on-board applications and telemetry with various ground-based systems. Embodiments of the ODN separate hardware and software aspects of the architecture to promote flexible, scalable solutions that are not tied to particular hardware implementations. Desirably, embodiments of the ODN allow for hardware, software, network hardware, network organization, network services, certification bases, and other elements of the ODN to be usable with different aircraft, and to allow each of the components to be used to support different functions within a reference architecture.

As previously described, conventional, on-board systems tend to be special-purpose, self-contained systems to support specific applications such as on-board entertainment or maintenance tracking services. Use of multiple self-contained systems may be wasteful in a number of ways. For example, although one system may not have sufficient capacity to fulfill demands for its dedicated services, other systems may have excess capacity that goes unused. For further example, systems that communicate with ground-based systems, such as maintenance tracking systems and on-board Internet access systems, each will have to maintain its own air-to-ground communications system, even though each communication system may not be fully utilized. Similarly, as also previously described, currently proposed architectures are extensively tied to particular hardware implementations that are not suitable or practical for all environments, and are also not appropriately scalable for different needs. Moreover, current systems may not provide connectivity with the systems of all stakeholders, from the aircraft manufacturer, to the airline, to airports, and other partners. Accordingly, an ODN system that is operable to include COTS components and can communicate to share resources and communicate with a range of ground-based systems can improve the reliability, flexibility, and scalability of on-board systems.

Throughout this detailed description, embodiments of the invention are described in the exemplary context of using an ODN system on board an aircraft. Nonetheless, embodiments of the invention are adaptable to be used with a variety of different vehicles. For example, spacecraft, marine vessels, trains, land vehicles, and other vehicles also may benefit from an ODN system. For each of these vehicles, it may be desirable to have the flexibility and scalability of using systems within a reference architecture to allow systems to communicate with and share resources with one another, while selectively isolating systems that are critical to the guidance, thrust, and power systems of those vehicles. It should be appreciated that the advantages afforded to those on board an aircraft, including the flight crew, cabin crew, passengers, and others in communication with them, will also be beneficial to those persons involved with other vehicles.

FIG. 1 shows an aircraft 100 that includes a mode of an ODN system 110. As shown in FIG. 1, the two principal on-board systems include the ODN system 110 and the avionics system 120. The ODN system 110 and the avionics system 120 are coupled by an on-board network 130 to allow the avionics system 120 to use some of the resources provided by the ODN 110 and to allow the avionics system 120 to process, store, and communicate data using the ODN 110. Coupling the ODN system 110 and the avionics system 120 also permits the ODN system 110 to be used to economically transmit data from the avionics system 120 to ground stations.

The ODN 110 includes a plurality of subsystem to serve and interconnect other on-board systems (not shown). The ODN 110 includes a switch/router 140 that allows on-board systems to communicate with one another and access resources provided by the ODN 110. In one embodiment, the switch/router 140 includes a multi-port Ethernet switch and an Internet protocol ("IP") router that supports multiple separate virtual local area networks ("VLANs"). The switch/router 140 thus interconnects multiple devices distributed among multiple VLANs to enforce the separation and security of each of the individual groups of devices.

The ODN 110 also includes one or more servers, although only a single server 150 is shown for visual clarity. Server 150 suitably includes an application computing platform in the nature of a computing system with one or more processors, system memory, and storage, such as hard-disk storage, flash memory storage, or another preferably non-volatile storage. One or more servers 150 thus provide application and data services for on-board systems. For one example, the server 150 may include a network file server that includes an Ethernet interface with one or more network interface cards, as well as support for avionics interfaces as described further below.

Using a central server 150 with an on-board network, as is the case with ground-based networks, provides several advantages. For one example, the server 150 allows multiple systems to share files. For another example, a centralized server makes it more cost effective to provide a high capacity, high speed, and high reliability storage device to support the systems, when it may not be cost effective to provide equally capable storage devices for each of the standalone systems. Moreover, a server 150 can provide access to applications and data for passenger systems, for example, to provide on-board entertainment or Internet access to increase passenger satisfaction, as described further below.

In addition to the switch/router 140 and the server 150, the ODN 110 also includes a network manager 160. The network manager 160 selectively controls access to different systems and resources in communication with the ODN 110. In one embodiment, the network manager 160 operates in conjunction with the switch/router 140 control access to and the flow of data within the ODN 110.

In one embodiment, the ODN 110 also includes an avionics interface 170. As previously described, flight-critical avionics system desirably are independent of and isolated from other systems to prevent accidental or deliberate interference with flight-critical avionics systems. Notwithstanding, the avionics system may benefit from being able to route data via the ODN 110 for processing, storage, or data communications with ground systems, while flight deck avionics systems may benefit from access to the server 150 and other ODN resources for non-flight critical applications. The avionics interface 170, in one embodiment, supports the Aeronautical Radio, Inc. 429 ("ARINC 429") specification, the Avionics Full Duplex Ethernet ("AFDX") specification, and other avionics bus and interface specifications. Thus, the avionics interface 170 provides for controlled exchange of data between the flight deck avionics 120 and the ODN 110.

Embodiments of the ODN 110 also include common services 180. The common services 180 include air-to-ground transmission systems and other sharable systems.

Figure 4:
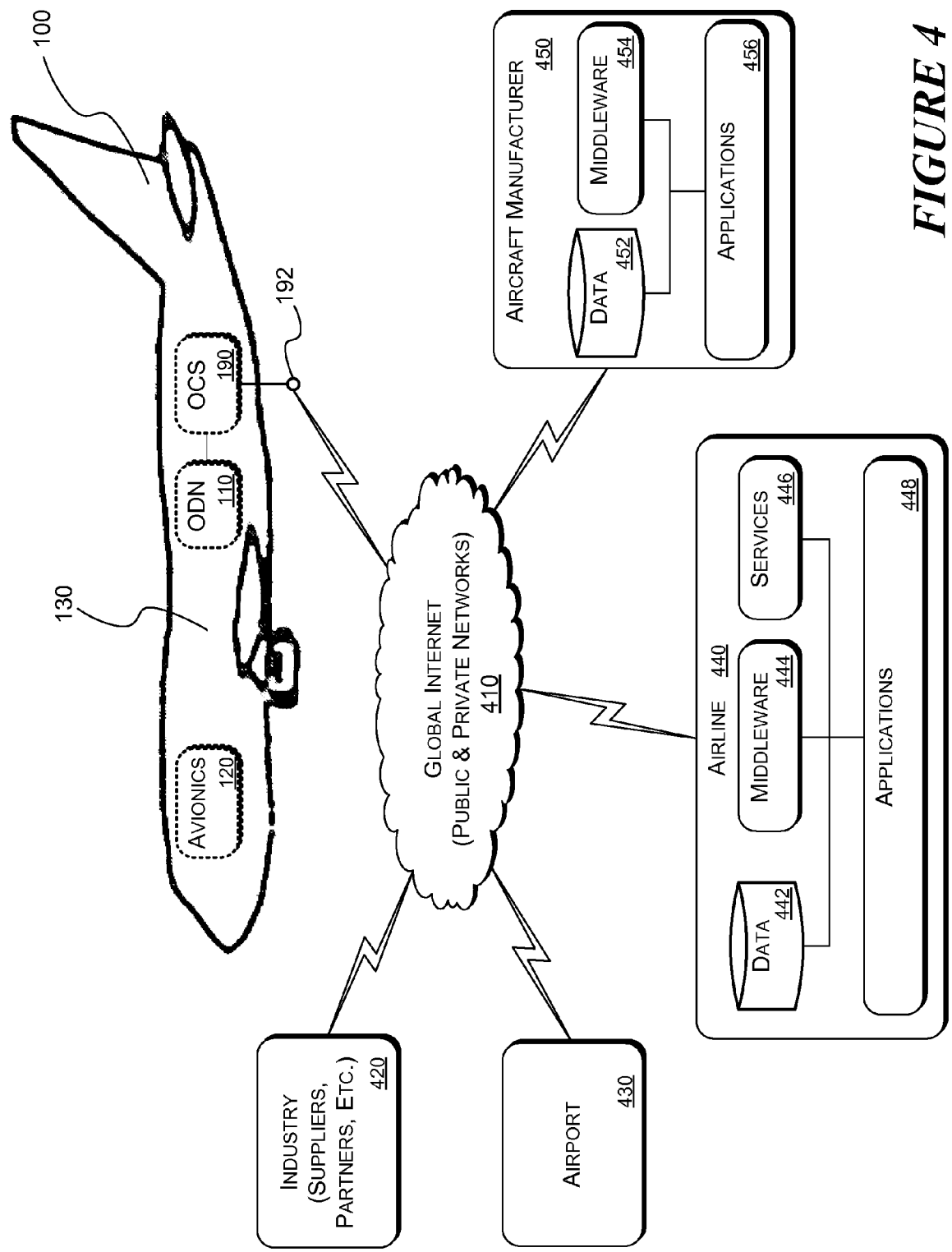
FIG. 4 is a schematic diagram of operational layers of a mode of an open data network.

In addition, embodiments of the ODN 110 include or are in communication with an off-board communications system 190. For sake of example, FIGS. 1 and 4 depict the off-board communications system 190 as a separate system coupled with the ODN 110 via a communications interface 192. Alternatively, as shown in FIG. 3, the off-board communications system 190 may be a sub-system or sub-net of the ODN 110, as further described below with regard to FIG. 3.

Using a suitable antenna 194, or multiple antennae, the off-board communications system 190 allows the ODN 110 and other systems in communication with the ODN 110 to communicate with other stations via radio, satellite transmission, or other media. The off-board communications system 190 may include broadband Internet protocol communications, such as a Connexion by Boeing® ("CBB") system, an air-to-ground telephone system, and other such systems.

It should be noted that the ODN 110 may operate both independently and in tandem with the off-board communications system 190. Thus, when the aircraft 100 is unable to communicate with other stations or otherwise not in communication with other stations, the ODN 110 is configured to operate in a "standalone" mode to enable communications between on-board systems as further described below. On the other hand, when the off-board communications system 190 is able to communicate with other stations, the ODN 110 and subsystems in communication with the ODN 110 are able to communicate with other stations. In one embodiment, the off-board communication system 190 includes a plurality of communications systems, each of which is configured to communicate with various stations such that the off-board communications system 190 is adaptable to allow the ODN 110 to communicate with available systems. Thus, for example, the off-board communications system 190 is operable to communicate with ground stations or other aircraft while in flight, to communicate with a terminal communications system while on the ground, or to communicate with other systems.

Implementation of an Open Data Network (ODN)

Figure 2:
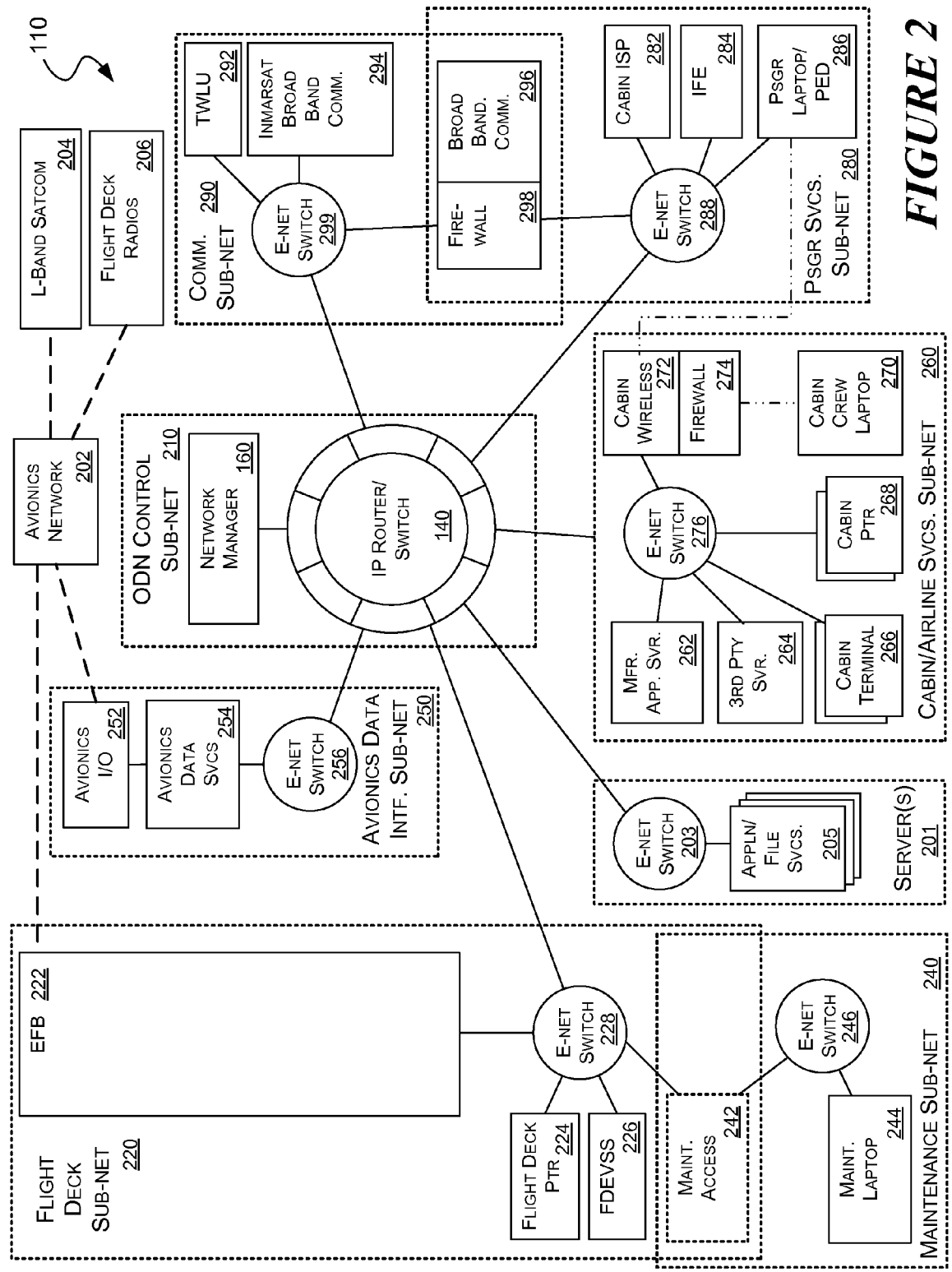
FIG. 2 is a schematic diagram depicting air-to-ground connectivity of the open data network system of FIG. 1.

FIG. 2 illustrates one exemplary embodiment of an ODN 110, illustrating an implementation using a number of physical and logical components. The exemplary embodiment includes a plurality of logical units, such as virtual local area networks or sub-nets, which selectively communicate with one another via the switch/router 140. It should be noted that FIG. 2 illustrates just one exemplary embodiment, and many other implementations of logical units, virtual local area networks, sub-nets, and other systems could be used to provide a workable operating environment for the ODN 110.

The ODN 110, as previously described, includes an avionics network 202 to enable communication with flight-deck avionics. The flight deck avionics may include both a flight-deck sub-net 220 and an IP avionics subnet 250. Via an avionics network 202, these sub-nets communicate with air-to-ground communications systems including an L-Band satellite communication system 204 and one or more flight deck radios 206 that facilitate communication between the flight deck avionics and ground facilities. It should be noted that, in the exemplary embodiment shown in FIG. 2, the avionics network 202 is separate from an ODN control sub-net 210 that facilitates communication between other on-board sub-nets described below. Accordingly, flight-critical avionics are coupled with essential communications resources via a separate network to ensure integrity.

An ODN control sub-net 210 facilitates and controls the flow of data between other on-board systems participating in the ODN 110. In one embodiment, the ODN control sub-net is self-contained and, thus, is separate from or partitioned from other devices participating in the ODN 110. The ODN control sub-net 210 includes the IP router/switch 140 and the network manager 160 as previously described. The network manager 160, in one embodiment, is implemented in software that controls the operation of the IP router/switch 140 to selectively control access of each of the sub-nets to other sub-nets. The ODN control sub-net 210 engages e-net switches, which may be physical or logical switches, in each of the other sub-nets, thus acting as a hub between the other sub-nets in the ODN 110.

A flight deck sub-net 220, as previously described, is coupled with communications resources 204 and 206 via a separate avionics network 202, but also communicates with the ODN control sub-net 210 via an e-net switch 228. As previously described, the ODN control sub-net 210 facilitates selective communication between non-flight critical systems on the flight deck and other on-board sub-nets. For example, the flight-deck sub-net 220 includes electronic flight bag ("EFB") systems 222 used by the flight crew to log observed faults and enter other information to complete pilot reports ("PIREPs") among other functions.

The flight deck sub-net 220 also includes a flight deck printer 224 and a flight deck entry video surveillance system 226 ("FDEVSS"). The flight deck printer 224 generates selected hard copy of information generated by the flight crew or directed to the flight deck by cabin or ground crews. The FDEVSS 226 includes one or more video sensors that monitor persons seeking access to the flight deck. The flight deck printer 224 and the FDEVSS 226 communicate via the e-net switch 228 with the EFB 222 and other systems.

The flight deck sub-net 220 also includes a maintenance access 242 that is shared with a maintenance sub-net 240. The maintenance access 242 communicates with the e-net switch 228 of the flight deck sub-net 220 and an e-net switch 246 of the maintenance sub-net. A maintenance laptop 244 accesses the maintenance access 242 via the e-net switch 246. The maintenance laptop 244, or a similar maintenance console, allows personnel to perform software loading and maintenance of the on-board systems from a single access point by communicating with systems in respective sub-nets via the ODN control sub-net 210 via the IP switch/router 140.

An avionics data interface sub-net 250 also participates in the ODN 110 for non-flight critical functions. The avionics data interface sub-net 250 is one embodiment of the avionics interface 170 (FIG. 1) that provides selective communication between the avionics network 202 and the rest of the ODN 110. An avionics input/output interface 252 couples the avionics network 202 with an avionics data services module 254. The avionics data services module 254 communicates with the ODN control sub-net 210 via an e-net switch 256.

A cabin/airline services subnet 260 also participates in the ODN via the ODN control sub-net 210. The cabin/airline services subnet 260 provides support for the cabin crew in flight, and also includes nodes that support applications for the airline operating the aircraft, as well as the manufacturer of the aircraft and other third parties involved with the aircraft manufacturer or the airline. Thus, the cabin/airline services sub-net includes a manufacturer application server 262 and a third-party server 264 in communication with an e-net switch 276 that communicates with the router/switch 140 of the ODN control sub-net 210. One or more cabin terminals 266 communicate via the e-net switch 276 with the manufacturer application server 262 and the third party server 264, as well as other systems in communication with the ODN control sub-net 210. From the cabin terminals, cabin crew or maintenance personnel can access available services and generate printed reports on one or more cabin printers 268.

According to one embodiment, the cabin/airline services sub-net 260 is also accessible wirelessly. A cabin wireless access point 272 communicates with the ODN control sub-net 210 via the e-net switch 276. A cabin crew laptop 270 communicates with the cabin wireless access point 272 through a firewall 274 that restricts other systems, such as passenger computers, from accessing cabin crew/airline systems and applications. In one embodiment, the firewall employs wireless encryption protocol to encrypt communication between the cabin crew laptop 270 and the cabin wireless access point 272. Thus, via the cabin crew laptop 270, the cabin crew or maintenance personnel can wirelessly access on-board services, including services accessible via the cabin terminals 266. The cabin wireless access point 272 also facilitates access from passenger devices, as described below.

A passenger services sub-net 280, in one embodiment, facilitates access to in-flight entertainment ("IFE"), as well as access to cabin Internet services provider ("ISP") 282. The electronic communicate with the communications resources. Passengers, using his or her own laptop computer or other personal electronic device ("PED") 286, can access on-board services through a wired or wireless connection. Some aircraft may provide Ethernet or other wired network taps at passenger seat locations. Using these wired network taps, users of passenger laptops or PEDs communicate via an e-net switch 288 to IFE 285, the cabin ISP 282, or other accessible on-board services. Alternatively, the passenger laptop computers or PEDs 286 may connect wirelessly with the cabin wireless access point 272, and wirelessly access on-board systems.

A communications sub-net 290 provides communication resources for non-flight critical applications. In one embodiment, the communications sub-net 290 performs the functions of an off-board communications system 190 (FIG. 1), functioning as a sub-net of the ODN 110 rather than as a separate system as alternatively described. The communications sub-net 290 includes a terminal wireless local area network unit ("TWLU") 292 that facilitates communication between the aircraft and the terminal when the aircraft is on the ground. When airborne, an in-flight broadband service, such as a Connexion by Boeing® (CBB) system or an Inmarsat broadband communications system 294 provides air-to-ground communications. The TWLU 292 and Inmarsat broadband communications system 294 both communicate via an e-net switch 299 with the ODN control sub-net 210. In addition, via a firewall 298, the communications sub-net 290 and the passenger services sub-net 280 communicate with a core broadband communications system 296 to facilitate Internet services for passengers and/or the crew.

The ODN 110 also includes one or more servers 201. The server includes an e-net switch 203 that interconnects with the switch/router 140 of the ODN control sub-net 210. The e-net switch 203 couples application and file services 205 with the switch/router 140 to provide processing, storage, and other resources to facilitate storage and processing needs of sub-nets participating in the ODN 110. Inclusion of one or more servers 201 provides scalable support for each of the other sub-nets participating in the ODN 110 to enable various applications or accommodate storage needs for those sub-nets.

In sum, one should note several aspects of the ODN 110. First, many of the components are COTS components. Second, by dividing the ODN 110 into a plurality of sub-nets, each of the sub-nets may be included or omitted as desired. Third, the independence of each of the sub-nets is easily scalable without having to scale all of the corresponding systems. Fourth, the connectivity between sub-nets and within the sub-nets is selective. As described, for example, various crew or maintenance functions are firewalled from those nodes that provide passenger services, and flight-critical systems and applications are facilitated by separate systems, such as the avionics network 202, to secure flight-critical applications from interference with other services. At the same time, the described reference architecture is deployable across a variety of aircraft models and platforms Software Architecture Facilitating an ODN Disadvantages of existing aircraft network architectures include the hardware-centric focus of those systems and the lack of commonality across aircraft systems that would allow re-use of different components that may be included in an on-board network. Embodiments of the invention avoid hardware restrictions, and the functional limitations these restrictions impose, by using a software architecture that allows device independence. Establishing software layers, each of which provides designated functions, allows for applications to be developed and revised at a top-most layer, while allowing for hardware to be replaced, upgraded, or scaled without modifying the software to accommodate the hardware changes.

FIG. 3 illustrates an exemplary software architecture 300 including a plurality of layers that facilitates an ODN system as previously described. The exemplary software architecture 300 includes five different software layers 310, 330, 350, 370, and 380 operating over a physical packaging or hardware layer 390. An application layer 310 includes a range of on-board applications. For example, the application layer 310 shown in FIG. 3 supports EFB applications 312, cabin applications 314, airline applications 316, and passenger entertainment applications 318. One should note that the applications encompass the range of users that will be involved with the aircraft: the EFB applications 312 support the flight crew; the cabin applications 314 support the cabin crew for in-flight operations and to facilitate cabin maintenance; airline applications 316 assist airline management and maintenance personnel; and passenger entertainment applications 318, which may include IFE, Internet access, and other applications that make flights more enjoyable and/or productive for passengers. One should also note, to cite two examples, that EFB applications 312 and passenger entertainment applications 318 typically run on dedicated, standalone systems. However, the software architecture 300 allows these and other applications to share resources, to communicate with one another, and share data.

A systems services layer 330 provides support for the application layer 310 and helps to allow multiple applications to reside on a platform that shares resources. A security service 332 controls access of the applications in the application layer 310 to various resources, for example, to isolate cabin crew, flight crew, and passenger applications from one another. Card level services 334 provide services to allow multiple applications function on a single server. Electronic software delivery and dataload services 338 allow for software upgrades and maintenance to be performed from a single point of control without there having to be a separate hardware interface for each of the applications. Messaging documents services 340 route information between applications and between the aircraft and ground stations as appropriate. Again, because these general system-level services are provided to applications installed in an ODN environment, the individual applications need not include application-specific code to support these functions. Thus, for example, cabin applications 314 and airline applications 316 can communicate with other applications and ground-based systems using messaging documents services 340 without each of these applications having to include their own messaging documents code. The system services layer 330 therefore simplifies the task of upgrading and adding applications.

A network services layer 350, in turn, supports the system services layer 330 in supporting the applications executing on the applications layer 310. Largely, the network services layer 350 provides functions analogous to those provided by network services in ground-based networking systems. The network services layer 350 provides network management services 352 to control access to resources within the network. Internet protocol ("IP") services 354 includes domain name services and dynamic host configuration protocol services to allow information to be routed between flight crew, cabin crew, maintenance crew, and passenger applications over the Internet, as further described below with regard to FIG. 4. Degraded operation services 356 provides for services when certain network functions are not available as either backups or partial capabilities. Network addressing services 358 control how different systems and sub-nets are addressed by other systems. Wireless access services 360 facilitate wireless access of cabin crew and passenger devices using IEEE 802.11 and other protocols.

A network architecture layer 370 supports the network services layer by facilitating and managing communications across the ODN using different networking topologies. The network architecture layer 370 supports Ethernet access 372 to allow for crew and passenger devices equipped with Ethernet communications capabilities to participate in the ODN. IP access 374 also is supported to allow crew and passenger communications over the Internet. VLANs and sub-nets 376 access allows different systems to be grouped into logical groups. These logical groups allow, for example, flight deck systems or passenger systems to be joined in their own VLANs or sub-nets to promote efficient exchange of data within those sub-nets, as well as to restrict and control access between the sub-nets to ensure isolation of those devices as desired. To this end, firewalls 378 are maintained in the network architecture layer 370 to restrict access between the VLANs and sub-nets.

An operating system ("OS") layer 380 both manages the hardware layer 390 and manages requests from the other layers for hardware resources. In one embodiment of the software architecture 300, multiple operating systems are supported. For example, the OS layer 380 includes both Microsoft Windows® 382 and Linux 384 or other unix-derived operating systems. By supporting multiple operating systems, the ODN can take advantage of applications written for each of these operating systems to provide flexibility in installing flight crew, cabin crew, maintenance crew, and passenger applications. Similarly, support for multiple operating systems also provides flexibility in hardware systems used to support the ODN, as some hardware systems are better adapted to use of one operating system or another.

The physical packaging/hardware layer 390, separated from the applications layer 310 by a number of supporting layers, can include a wide range of devices. For example, conventional personal computer and server systems can be included in the hardware layer 390, as well as aircraft-specific type systems such as ARINC systems and other systems.

In sum, the software architecture 300, instead of having a few hardware devices that support a limited range of operating systems, software services, and applications, allows for a wide range of hardware devices and applications to be used in the ODN. Intervening software layers promote flexibility and scalability of the ODN because the intervening layers provide services that manage designated services operable to interconnect different systems and functions.

Communications/Integration Capabilities Facilitated by an ODN

The ODN, both from a hardware architecture (FIG. 2) and a software architecture (FIG. 3) standpoint, not only supports a wide and flexible range of on-board services as described above, but supports efficient communications between on-board systems and ground-based systems.

FIG. 4 illustrates how the ODN 110 facilitates communication between on-board systems and ground-based systems, thereby allowing various stakeholders in the operation of the aircraft to communicate with the aircraft 100. The ODN 110, as previously described with regard to FIGS. 1 and 2, uses an off-board communications system (OCS) 190 or a communications sub-net 290, respectively, to communicate with ground-based systems or other systems while in flight or on the ground. The off-board communications system 190 may include one or more antennae 192 for purposes of communicating with other systems. For purposes of FIG. 4, the OCS 190 is depicted as a single communications system. Nonetheless, it should be appreciated that the OCS 190 may include multiple, separate satellite, radio, and other communications system as previously described. It also should be noted that FIG. 4 does not show proprietary communications systems used for flight-critical communications which, as previously described, desirably are isolated from other systems and communications.

Using the OCS 190, the ODN 110 communicates with and participates in a global Internet 410. The global Internet 410, as is well understood, includes a plurality of public and private networks. Thus, by participating in the global Internet 410, applications on board the aircraft 100 can communicate over virtual private networks or other private networks with various stakeholders. Similarly, passengers or crew members also can access public networks for business, entertainment, or personal purposes.

A significant advantage of the ODN 110 is the ability of the aircraft 110 to communicate with systems of various stakeholders. For example, via the global Internet 410, the ODN 110 is able to communicate with various industry stakeholders 420. These industry stakeholders 420 may include suppliers, ranging from fuel suppliers to catering providers or any other service providers. Direct communication between the aircraft 100, either while in flight or on the ground, with the industry stakeholders 420 facilitates direct, efficient communication with these industry stakeholders 420, rather than relaying information via the airline or another intermediary. The ability to transmit data in "real time" enables maintenance personnel to diagnose problems with the aircraft in flight before the aircraft lands, thereby allowing for resources to be standing by to remedy the problem when the plane arrives at its next destination. Another advantage is that, in and of itself, the ODN allows the aircraft to operate as a mobile, ad-hoc network that migrates around the world. Thus, the ODN is operable regardless of local systems in areas where the aircraft may be in operation.

Similarly, the ODN 110 can communicate via the global Internet 410 with an airport 430 to facilitate, for example, flight planning, maintenance, gate operations, and passenger-related functions.

Airline systems 440 also communicate via the global Internet 410 with the ODN 110. Direct communication between on-board systems and the airline 440 provides a number of advantages. For one example, direct communication between EFBs and the airline 440 can greatly facilitate aircraft maintenance activities. When the flight crew enters a fault code representing an observed or a suspected fault, the ODN 110 communicates this information via the global Internet 410 to the airline 440. The communication is processed by the airline. Middleware 444 receives the communication, records the communication in data storage 442, and engages related services 446 to support applications 448 such as ground-based fault processing tools to allocate personnel and materials to address possible safety concerns and avoid service interruptions. Correspondingly, applications 448 can be used to communicate information or software updates to systems participating in the ODN 110 aboard the aircraft 100. Because of the ODN 110 provides a network between the airline 440 and the aircraft 100, these services can be performed in the same manner that similar transfers of information are performed between nodes participating in ground-based networks.

Furthermore, the ODN 110 also communicates via the global Internet 410 with the aircraft manufacturer 450. With ongoing communications between the aircraft 100 and the aircraft manufacturer 450, the aircraft manufacturer can actively participate in ongoing maintenance concerns regarding the aircraft 100, and other aircraft it manufactures. From the standpoint of the aircraft manufacturer 450, ongoing collection of data can assist the aircraft manufacturer 450 in identifying maintenance concerns for various types of aircraft or aircraft systems. Receiving reports including, for example, parametric engineering or operating data, the reports are processed by middleware 454 and information contained in the reports is logged in data storage 452. This data is usable for statistical analysis to identify system design problems or performance degradation issues. Applications 456, such as maintenance applications, can be used by aircraft manufacturer personnel to identify systems that require engineering fixes or design changes. To that end, software changes can be delivered directly by the aircraft manufacturer 450 to the aircraft 100 via the global Internet 410 and the ODN 110.

For another example, the aircraft manufacturer also can add value by providing in-flight services to the aircraft. For example, The Boeing Company's Connexion by Boeing® system provides in-flight Internet access to passengers. Similarly, live television or other broadcasts can be provided by the aircraft manufacturer to the aircraft 100 via the ODN 110. The ODN 110 also may allow the airline 440 or third-party industry suppliers 420 to provide such services to the aircraft 100 while in flight or on the ground.

Exemplary Operating Environment for Software

Figure 5:
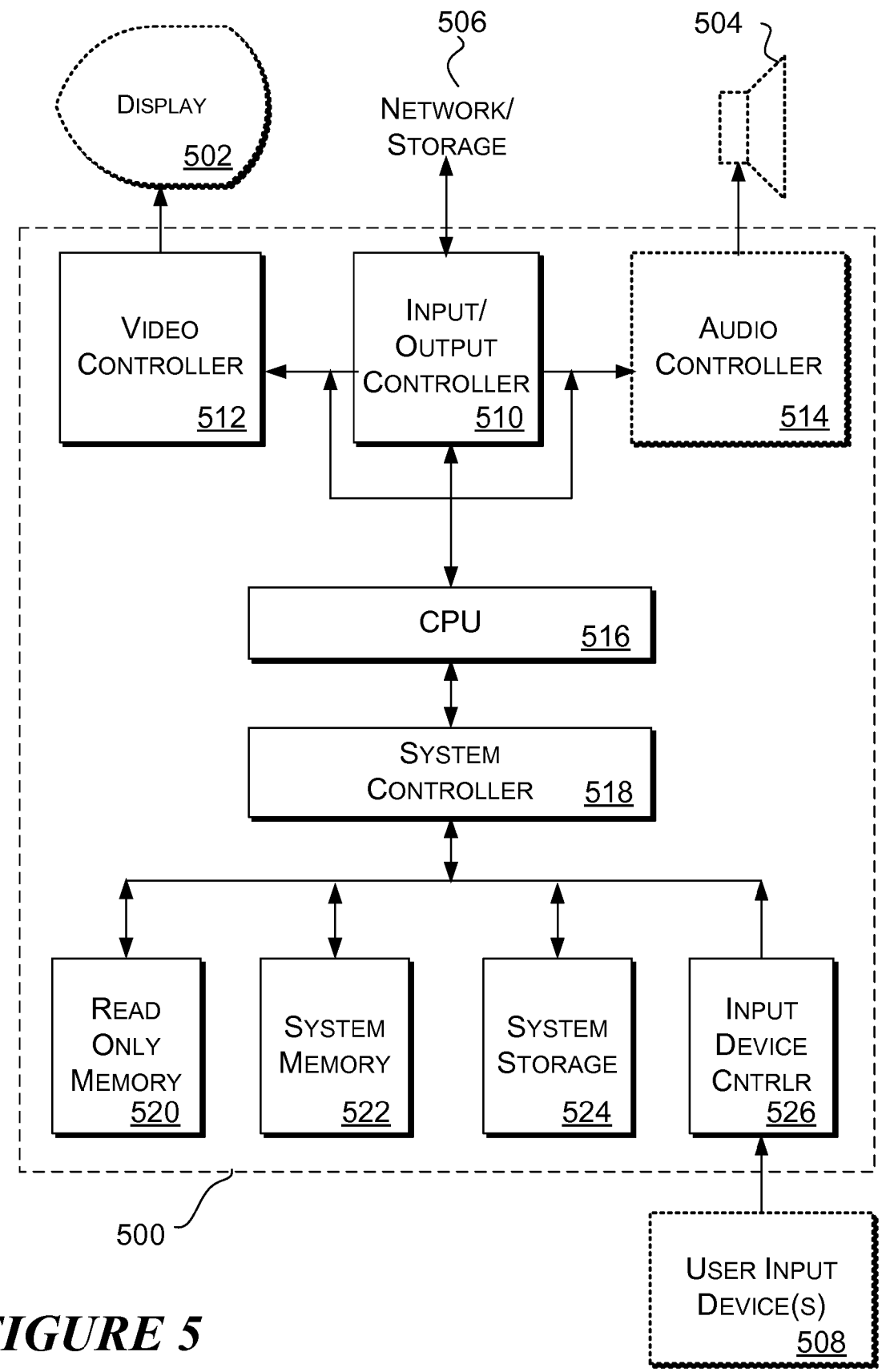
FIG. 5 is a block diagram of a general purpose computing system operable to participate in or manage a portion of the open data network.

FIG. 5 is a generalized computer system 500 operable to support operation of software embodiments of the present invention. The computer system 500 includes components that may be included in some or all of the devices used on the flight deck, the cabin, and at ground stations to participate in and share data among these systems using embodiments of the ODN 110. Such a computer system 500 also may include other subsystems to facilitate the need of each computing system. Appropriate software executing on a generalized computer systems thus facilitates execution of applications and communication of data between those applications, as well as of the intermediate systems and services described with regard to FIGS. 1-4.

The computer system 500 may be operable for controlling an optional display 502, such as a monitor, for systems in which visual interaction with a user is desirable. Similarly, the computer system 500 may include an audio controller 514 and/or an audio subsystem 504, for presenting audible information to a user when audible interaction with a user is desired. The computer system 500 communicates information with a local area network using one or more network topologies, and/or with other storage 506, such as provided by servers. When the computer system 500 is situated to receive user input, the computer system 500 also may receive user input from a wired or wireless user keypad 508, which may be in the nature of a computer keyboard, or another input device such as a touch sensitive or pen-sensitive interactive display.

The computer system 500 receives input via an input/output controller 510, which, as appropriate, directs signals to and from a video controller 512, an audio controller 514, and a central processing unit (CPU) 516. In turn, the CPU 516 communicates through a system controller 518 with input and storage devices such as read only memory (ROM) 520, system memory 522, system storage 524, and input device controller 526.

Method of Forming an Open Data Network

Figure 6:
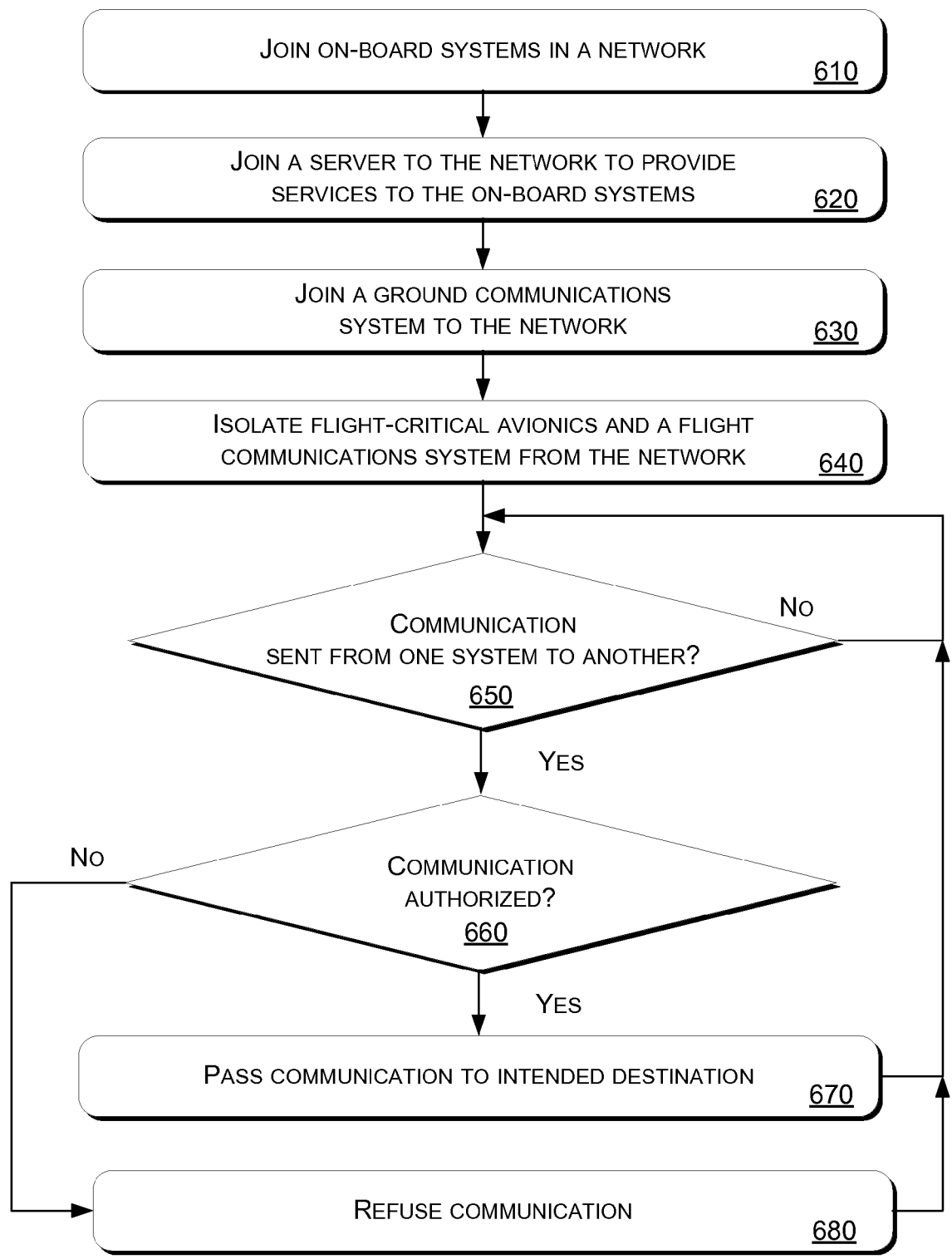
FIG. 6 is a flow diagram of a method of forming an open data network on board an aircraft.

FIG. 6 illustrates a process of creating an open data network on board an aircraft. At 610, on-board systems are joined in a network. As previously described, the on-board systems may include flight-deck systems, cabin services systems, maintenance systems, and passenger services systems. In one embodiment, the on-board systems use a plurality of software layers including an application layer, a hardware layer, and one or more intermediary services layers that manage provision of services between the applications and the hardware. The layers allow changes to be made to the applications and the hardware, such as changing or scaling applications and hardware, without having to modify the applications or hardware to be able to participate in the open data network.

At 620, a server is joined to the network to provide processing, storage, or other services to the on-board services. At 630, a ground communications system is joined to the network to allow one or more of the on-board systems to communicate with a ground-based network. Via the ground communications system and the ground-based network, on-board systems are operable to communicate with stakeholders in the operation of the aircraft, including the aircraft manufacturer, the airline operating the aircraft, an airport, and third parties who participate in the operation of the aircraft, such as suppliers. At 640, flight-critical avionics and a flight communications system are isolated from the network to prevent accidental or intentional interference with the operation of the flight-critical avionics and the flight communications system.

Communication between on-board systems is selective to maintain the integrity of the on-board systems. At 650, it is determined if a communication has been sent from one on-board system to another. Once a communication is detected, at 660, it is determined if the communication is authorized. Specifically, it is determined if the communication from the on-board system from which the communication originated is authorized to communicate with the on-board system or the ground communication system to which the communication is directed. If the communication is authorized, at 670, the communication is passed to its intended destination. On the other hand, if it is determined at 660 that the communication is not authorized, at 680 the communication is refused.

CONCLUSION

While preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An aircraft comprising:
    a plurality of subnets for providing flight-critical services, non-flight-critical services, and passenger services;
    a plurality of e-switches for selectively isolating the subnets; and
    a computer system running a network manager for providing network management services via a network protocol to each of the plurality of subnets, wherein the network protocol enables selective secure isolation between the subnets and data connectivity between the subnets.

2. The aircraft of claim 1, wherein the subnets and computer system communicate via a protocol that includes an IP layer, a network services layer on the IP layer, a system services layer on the network services layer, and an applications layer on the system services layer.

3. The aircraft of claim 2, wherein the system services layer controls access of applications in the applications layer to provide the selective secure isolation.

4. The aircraft of claim 2, wherein the network services layer provides at least some of network management, IP services, degraded operation, network addressing, and wireless access.

5. The aircraft of claim 2, further comprising a hardware layer, wherein changes in the application layer and the hardware layer are performable independently of changes to other layers.

6. The aircraft of claim 2, wherein the application layer supports at least some of electronic flight bag ("EFB") applications, cabin applications, airline applications, and passenger entertainment applications.

7. The aircraft of claim 1, further comprising an aircraft avionics system for providing at least some of the flight critical services.

8. The aircraft of claim 7, wherein the network protocol enables selective secure isolation to prevent accidental or deliberate interference with the avionics system.

9. The aircraft of claim 1, further comprising a router for dividing the network into subnets.

10. The aircraft of claim 9, wherein the network manager is operable to communicate with the e-switches and the router.

11. The aircraft of claim 1, further comprising a subnet for providing storage and processing to the other subnets.

12. The aircraft of claim 1, wherein the subnets include a flight deck subnet, maintenance subnet, avionics data interference subnet, cabin services subnet, passenger services subnet, and communications subnet.

13. The aircraft of claim 1, wherein each subnet includes a collection of elements that provide a particular aircraft service.

14. The aircraft of claim 1, wherein the network protocol enables selective secure data connectivity between the subnets by refusing unauthorized communications.

15. The aircraft of claim 1, further comprising at least one of a flight deck services system; a maintenance services system; and a cabin services system for providing at least some of the non-flight critical services.

* * * * *